(12) United States Patent
Fujii

(10) Patent No.: US 8,813,887 B2
(45) Date of Patent: Aug. 26, 2014

(54) BATTERY UNIT MOUNTING STRUCTURE FOR VEHICLE

(71) Applicant: Suzuki Motor Corporation, Hamamatsu (JP)

(72) Inventor: Naoto Fujii, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/939,855

(22) Filed: Jul. 11, 2013

(65) Prior Publication Data

US 2014/0027189 A1 Jan. 30, 2014

(30) Foreign Application Priority Data

Jul. 25, 2012 (JP) .................................. 2012-164421

(51) Int. Cl.
*B60R 16/04* (2006.01)
*B60K 1/04* (2006.01)

(52) U.S. Cl.
CPC ........................................ *B60K 1/04* (2013.01)
USPC ....................................................... 180/68.5

(58) Field of Classification Search
CPC ....... B60R 16/04; Y02E 60/12; B60W 10/26; B60W 20/00
USPC ............................................... 180/68.5, 65.29
See application file for complete search history.

(56) References Cited

U.S. PATENT DOCUMENTS 8,051,934 B2 * 11/2011 Kiya et al. ................... 180/68.5
8,268,470 B2 * 9/2012 Matsumoto et al. ............ 429/71

FOREIGN PATENT DOCUMENTS

JP    2003-170748    6/2003
JP    2009-252688    10/2009

* cited by examiner

*Primary Examiner* — John Walters
*Assistant Examiner* — James Triggs
(74) *Attorney, Agent, or Firm* — Silicon Valley Patent Group LLP

(57) ABSTRACT

A battery unit mounting structure for a vehicle of the present invention includes a floor panel, a side member attached to a lower surface of the floor panel, and extending in a longitudinal direction of the vehicle, and a bracket mounted on an upper surface of the floor panel above the side member. The bracket includes an attachment portion which is attached to the side member in a three-layer structure, two vertical wall portions extending upward from respective corresponding end portions in a transverse direction of the vehicle of the attachment portion, and two support portions configured to support the battery unit, and each extending from an upper end of the corresponding one of the two vertical wall portions in a direction away from a center of the bracket.

11 Claims, 8 Drawing Sheets

A-A

BATTERY UNIT MOUNTING STRUCTURE FOR VEHICLE

CROSS-REFERENCE TO PENDING PROVISIONAL APPLICATION

This application claims the benefit of and priority to Japanese Application No. 2012-164421 filed Jul. 25, 2012 and entitled "Battery Unit Mounting Structure for Vehicle", which is assigned to the assignee hereof and which is incorporated herein by reference.

BACKGROUND

I. Field of the Invention

This disclosure relates to battery unit mounting structures for vehicles including a battery unit, and more particularly, to a vehicle battery unit mounting structure for mounting a battery unit on a floor panel of a vehicle.

II. Background

Electric vehicles and hybrid vehicles (including plug-in hybrid vehicles), which are driven by a motor, have become widespread. In electric vehicles and hybrid vehicles, electricity is used as a power source for operating the motor, and therefore, a drive battery unit such as a lithium ion battery unit or the like is provided. The drive battery unit is typically provided in the passenger compartment.

Japanese Patent Laid-open Publication No. 2003-170748 describes a structure for mounting the drive battery unit on a floor panel below a front seat. Japanese Patent Laid-open Publication No. 2009-252688 describes a structure which allows efficient adjustment of the temperature of the drive battery unit provided in the passenger compartment without directly connecting an air conditioning duct to the casing of the drive battery unit.

When the drive battery unit is provided in the passenger compartment as in the techniques of Japanese Patent Laid-open Publication No. 2003-170748 and Japanese Patent Laid-open Publication No. 2009-252688, it is preferable that the outlet of the air conditioning duct be provided around the drive battery unit in order to efficiently adjust the temperature of the drive battery unit.

However, for recent automotive vehicles, attempts have been extensively made to reduce cost, weight, and space. Accordingly, it is desirable that the arrangement of the drive battery unit and the air conditioning duct should contribute to such reductions. When the drive battery unit is mounted on a floor panel of a vehicle, it is desirable that the floor panel, which is not at all thick, should be reinforced at the same time.

With the foregoing in mind, it is an object of the present invention to provide a battery unit mounting structure for a vehicle which allows a drive battery unit and an air conditioning duct to be mounted on a floor panel of the vehicle in a manner that reduces cost, weight, and space, and also allows the floor panel to be reinforced.

BRIEF SUMMARY

To achieve the object, a representative configuration of the present invention is a battery unit mounting structure for a vehicle including a battery unit, including a floor panel configured to form a floor surface of the vehicle, a side member attached to a lower surface of the floor panel, and extending in a longitudinal direction of the vehicle, and a bracket mounted on a region above the side member of an upper surface of the floor panel. The bracket includes an attachment portion provided on the upper surface of the floor panel, with the attachment portion, the floor panel, and the side member being joined on top of each other in a three-layer structure, two vertical wall portions extending upward from respective corresponding end portions in a transverse direction of the vehicle of the attachment portion, and two support portions configured to support the battery unit, and each extending from an upper end of the corresponding one of the two vertical wall portions in a direction away from a center of the bracket.

With the above configuration, the bracket has a cross-section in the shape of a so-called inverted hat (a rectangular waveform) when the bracket is attached to the floor panel. In a conventional typical example, a bracket has a cross-section in the shape of a hat when the bracket is attached to a floor panel. In this case, a space occupied by the bracket itself and an area of the floor panel occupied by the bracket are both large. In contrast, the above configuration provides the inverted hat-shaped bracket, whose dimensions can be reduced, leading to a reduction in cost, weight, and space. In addition, the attachment portion of the bracket, the floor panel, and the side member are joined on top of each other in a three-layer structure, and therefore, the floor panel can be reinforced. As a result, the risk of damage or a break or crack can be prevented or reduced in the floor panel.

A length in the vehicle transverse direction of the bracket may be smaller than or equal to a length in the vehicle transverse direction of the battery unit. The length in the vehicle transverse direction of the inverted hat-shaped bracket of the present invention is a dimension between outer end portions of the two support portions. This dimension is smaller than or equal to the length in the vehicle transverse direction of the battery unit. Therefore, the attachment portion can be further reduced. As a result, compared to, for example, a hat-shaped bracket, the bracket of the present invention has a smaller shape, leading to a reduction in cost, weight, and space.

The battery unit mounting structure for a vehicle may further include a cross member attached to the upper or lower surface of the floor panel, and extending in the vehicle transverse direction. The attachment portion of the bracket, the floor panel, and the cross member may be joined on top of each other in a three-layer structure. As a result, the floor panel can be further reinforced, whereby the risk of damage or a break or crack can be prevented or reduced in the floor panel.

The floor panel and the attachment portion of the bracket may each include a bead-shaped portion protruding downward, and the bead-shaped portions may be joined together. In this case, the floor panel and the attachment portion of the bracket are joined on top of each other in a two-layer structure at the highly stiff bead-shaped portions thereof, whereby the risk of damage or a break or crack can be prevented or reduced in the floor panel and the attachment portion of the bracket. Note that a cable or the like may be provided in a space formed by the bead-shaped portions protruding downward.

The battery unit mounting structure for a vehicle may further include an air conditioning duct. The air conditioning duct may be mounted below the battery unit supported by the two support portions, inside the two vertical wall portions. Thus, even when the bracket has a cross-section in the shape of an inverted hat when the bracket is attached to the floor panel, an air conditioning duct can be mounted, in a similar way to when a bracket has a cross-section in the shape of a hat.

The present invention can provide a battery unit mounting structure for a vehicle which allows a drive battery unit and an air conditioning duct to be mounted on a floor panel of the vehicle in a manner that reduces cost, weight, and space, and also allows the floor panel to be reinforced.

DETAILED DESCRIPTION

Figure 1:
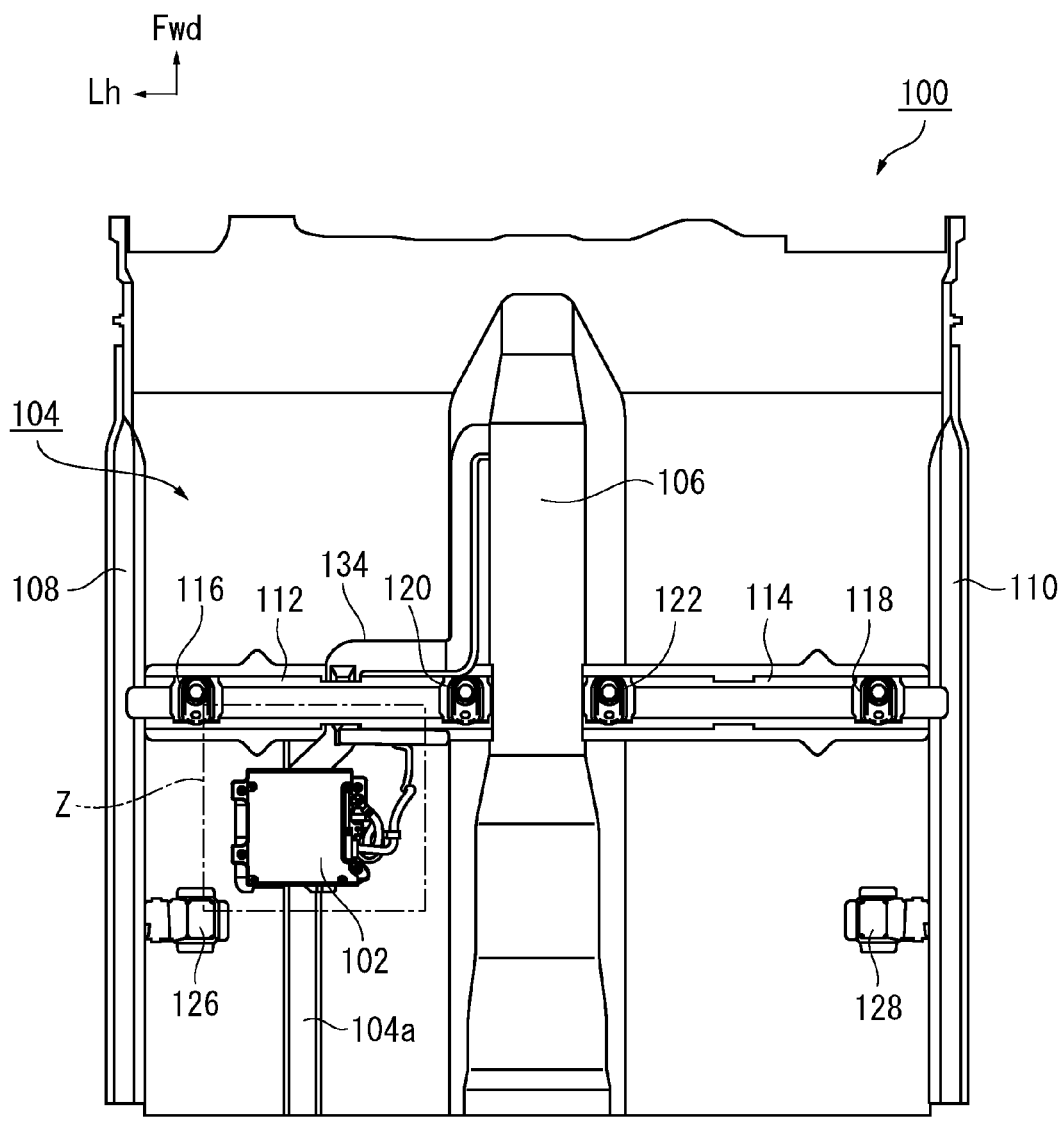
FIG. 1 is a top view of a floor panel of a vehicle in which a vehicle battery unit mounting structure according to the present invention is embodied.

Preferred embodiments of the present invention will be described in detail hereinafter with reference to the accompanying drawings. Dimensions, materials, other specific numerical values, and the like described in the embodiments are merely for illustrative purposes for ease of understanding of the present invention and are not intended to limit the present invention unless otherwise specified. Note that, in the specification and drawings, parts having substantially the same function or configuration are indicated by the same reference numerals and will not be redundantly described, and parts which are not directly related to the present invention are not shown.

Note that, in the drawings, a "front side or forward direction with respect to a vehicle" is indicated by an arrow Fwd, and a "left side or leftward direction with respect to a vehicle" is indicated by an arrow Lh.

FIG. 1 is a top view of a floor panel 104 of a vehicle 100 in which a vehicle battery unit mounting structure according to the present invention is embodied. As shown in FIG. 1, in the vehicle 100, a battery unit 102 is mounted on the floor panel 104, which forms a floor surface of the vehicle. The battery unit 102 is a drive battery unit for operating a motor, i.e., a lithium ion battery unit. The floor panel 104 includes a tunnel portion 106 which is convex upward at substantially the middle in a transverse direction of the vehicle. The floor panel 104 may, for example, include separate panels provided on the left and right sides of the tunnel portion 106.

A floor panel upper cross member 112 extending in the vehicle transverse direction is attached to an upper surface of the floor panel 104 between the tunnel portion 106 and a side sill 108 which is provided on the left side of the vehicle. A floor panel upper cross member 114 extending in the vehicle transverse direction is attached to the upper surface of the floor panel 104 between the tunnel portion 106 and a side sill 110 which is provided on the right side of the vehicle. Note that end portions closer to the tunnel portion (i.e., closer to the center) of the floor panel upper cross members 112 and 114 are connected together by a tunnel cross member which is arranged along the shape of a lower surface of the tunnel portion 106. The floor panel upper cross members 112 and 114 and the tunnel cross member are provided at substantially the middle in a longitudinal (front-to-back) direction of the vehicle of the floor panel 104 shown.

A front outer bracket 116 and a front inner bracket 120 are attached to the floor panel upper cross member 112. The front outer bracket 116 is attached to an outer portion in the vehicle transverse direction, and the front inner bracket 120 is attached to an inner portion in the vehicle transverse direction. A rear outer bracket 126 is attached to a floor panel lower cross member 124 described below at an outer portion in the vehicle transverse direction. Note that, similarly, a front outer bracket 118, a front inner bracket 122, and a rear outer bracket 128 are attached on the right side of the vehicle.

Figure 2:
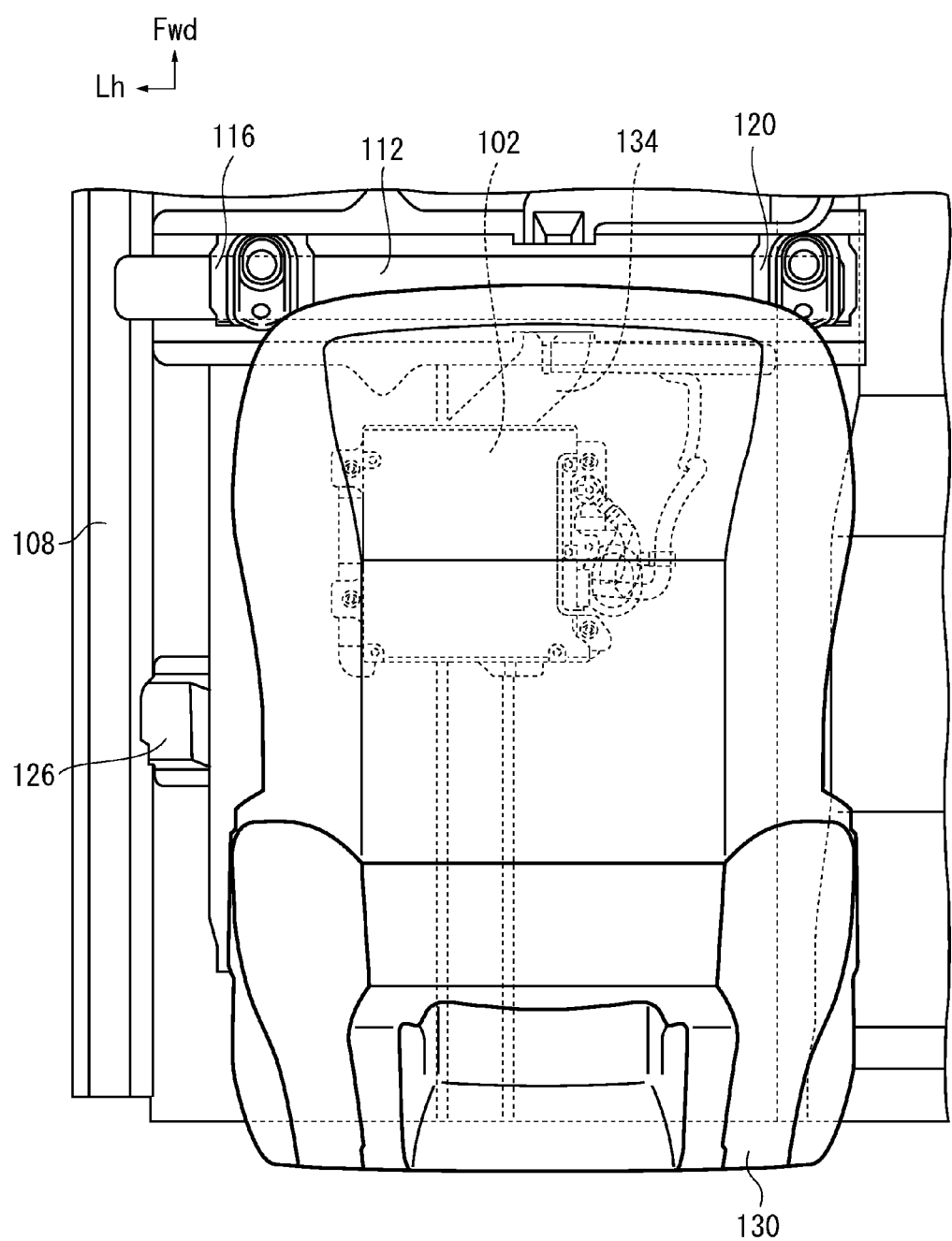
FIG. 2 is a diagram of a seat mounted at a passenger seat position of FIG. 1.

FIG. 2 is a diagram of a seat 130 mounted at a passenger seat position of FIG. 1. As shown in FIG. 2, the seat 130 is mounted at the passenger seat position by the front outer bracket 116, the front inner bracket 120, and the rear outer bracket 126. In other words, these brackets are for mounting a seat. The battery unit 102 is mounted below the seat 130 provided at the passenger seat position (between the front outer bracket 116 and the rear outer bracket 126 in the vehicle longitudinal direction).

Figure 3A:
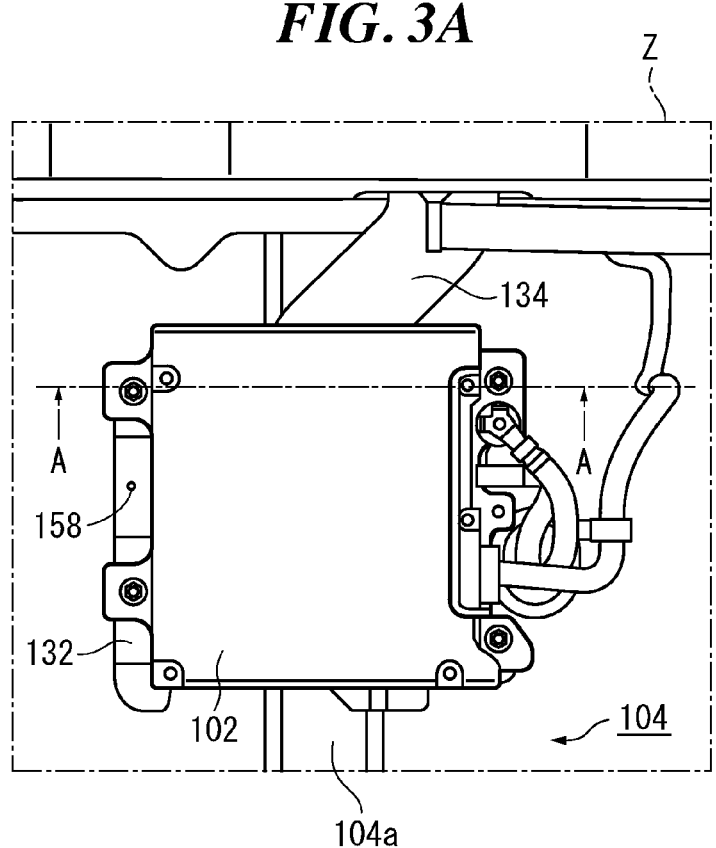
FIGS. 3A and 3B are enlarged views of a zone Z of FIG. 1.
Figure 3B:
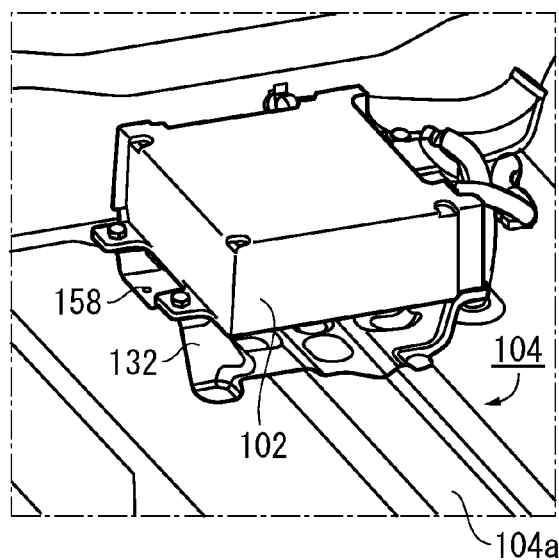

FIGS. 3A and 3B are enlarged views of a zone Z of FIG. 1. FIG. 3A is an enlarged view of the zone Z. FIG. 3B is a diagram of a part shown in FIG. 3A as viewed diagonally. As shown in FIGS. 3A and 3B, the battery unit 102 is supported by a bracket 132 which is a feature of this embodiment.

Figure 4A:
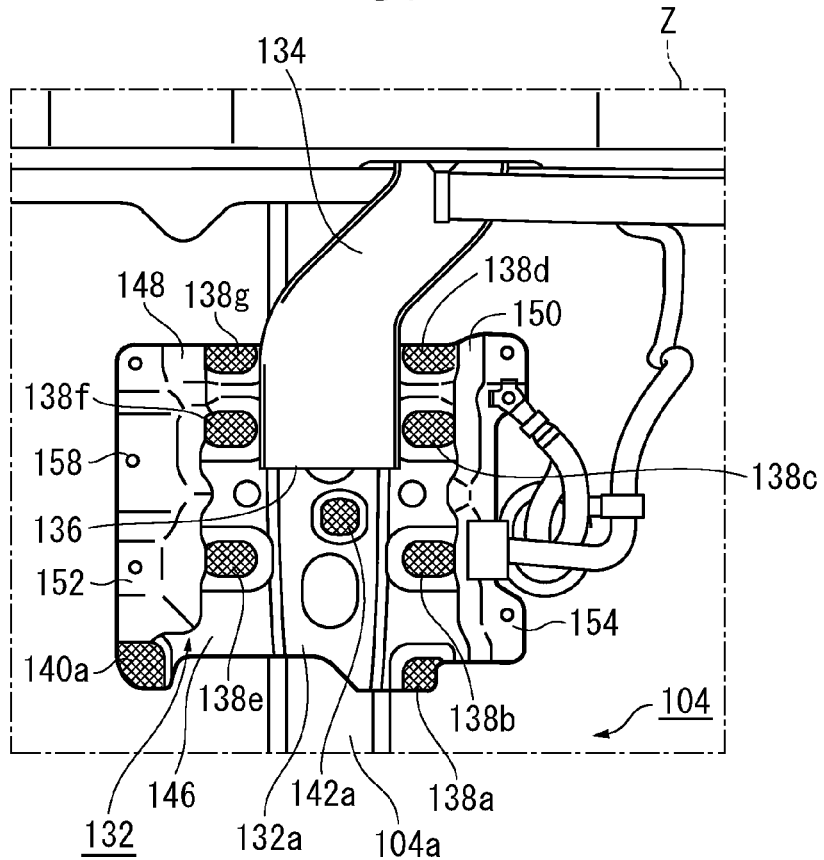
FIGS. 4A and 4B are diagrams of a part shown in FIGS. 3A and 3B from which a battery unit has been removed.
Figure 4B:
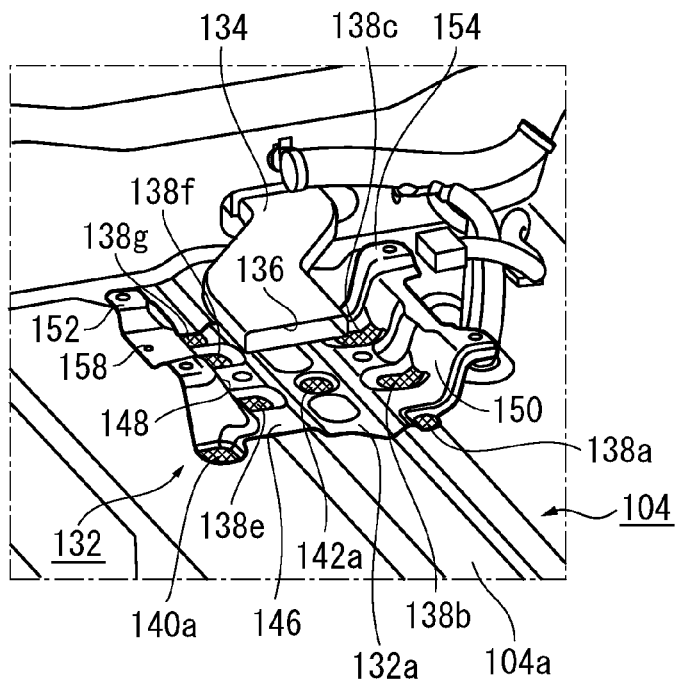

FIGS. 4A and 4B are diagrams of the part shown in FIGS. 3A and 3B from which the battery unit 102 has been removed. FIG. 4A is a diagram of the part shown in FIG. 3A from which the battery unit 102 has been removed. FIG. 4B is a diagram of the part shown in FIG. 3B from which the battery unit 102 has been removed. As shown in FIGS. 4A and 4B, in this embodiment, an outlet 136 of an air conditioning duct 134 is provided below the battery unit 102 in order to allow efficient adjustment of temperature of the battery unit 102.

Figure 5:
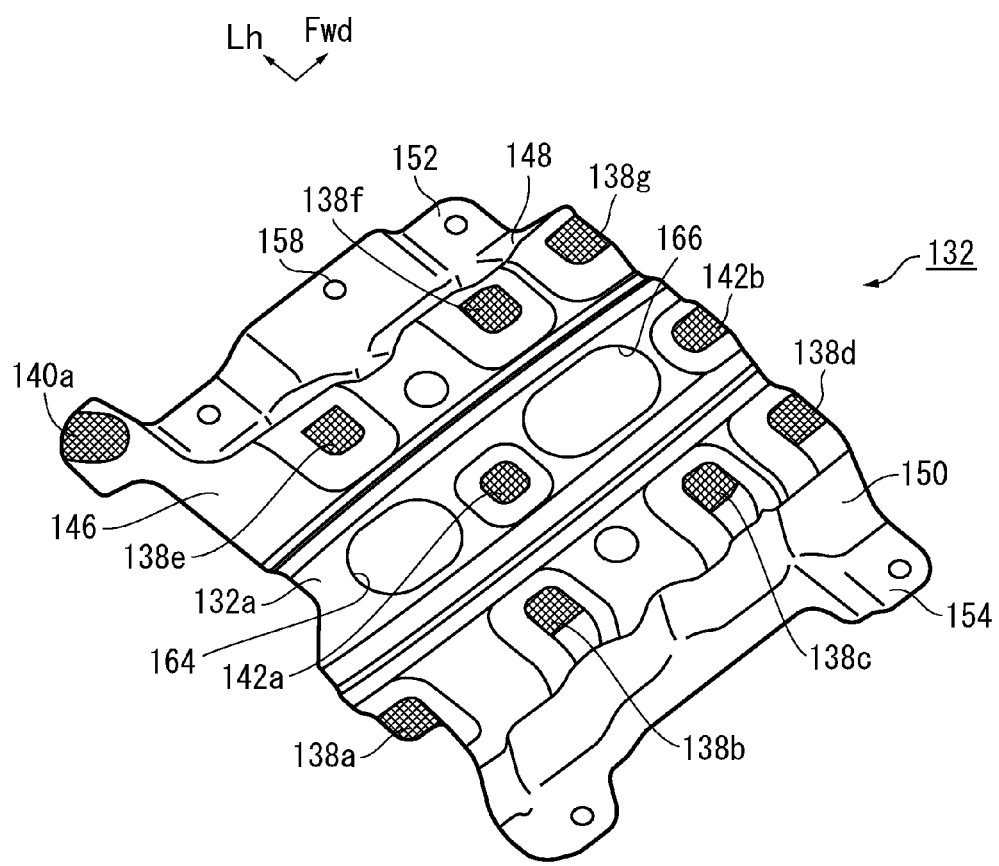
FIG. 5 is a perspective view of a bracket of FIGS. 4A and 4B.

FIG. 5 is a perspective view of the bracket 132 of FIGS. 4A and 4B. The bracket 132 is attached to the floor panel 104 at cross-hatched portions thereof shown in FIG. 5. Although described in detail below, each of attachment portions 138a, 138b, 138c, 138d, 138e, 138f, and 138g, the floor panel 104, and a side member 144 (see FIGS. 7A and 7B) are joined on top of each other in a three-layer structure. An attachment portion 140a, the floor panel 104, and the floor panel lower cross member 124 are joined on top of each other in a three-layer structure. Each of attachment portions 142a and 142b and the floor panel 104 are joined on top of each other in a two-layer structure.

Figure 6A:
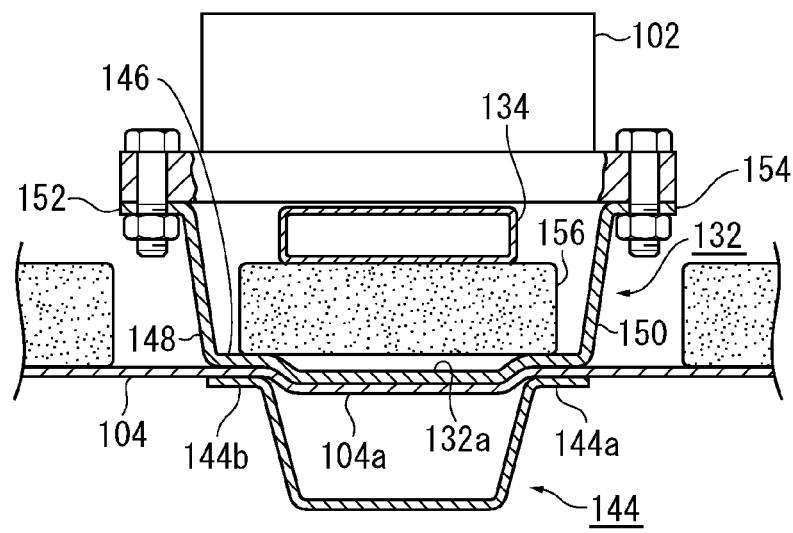
FIGS. 6A and 6B are cross-sectional views taken along line A-A of FIG. 3A.
Figure 6B:
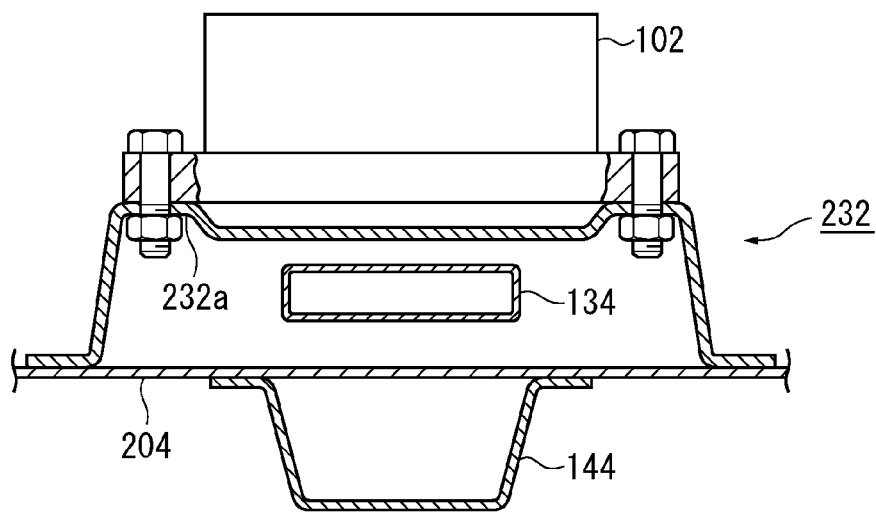

FIGS. 6A and 6B are cross-sectional views taken along line A-A of FIG. 3A. FIG. 6A is a cross-sectional view taken along line A-A. FIG. 6B is a cross-sectional view of a comparative example structure corresponding to FIG. 6A.

As shown in FIG. 6A, the bracket 132 has an attachment portion 146 which is provided on top of the upper surface of the floor panel 104 and attached thereto, two vertical wall portions 148 and 150 which extend upward from end portions in the vehicle transverse direction of the attachment portion 146, and two support portions 152 and 154 which extend from upper ends of the two vertical wall portions 148 and 150, respectively, in a direction away from a center portion of the bracket 132. In other words, the bracket 132 has a cross-section in the shape of an inverted hat when the bracket 132 is attached to the floor panel 104. The battery unit 102 is supported by the two support portions 152 and 154.

The bracket 132 of FIG. 6A is compared with the comparative example of FIG. 6B. In the comparative example of FIG. 6B, a bracket 232 has a cross-section in the shape of a hat when the bracket 232 is attached to a floor panel 204. The bracket 232 supports a battery unit 102 on an upper surface 232a thereof. An air conditioning duct 134 is provided inside the bracket 232. With this structure, however, the bracket 232 has a larger shape.

On the other hand, a shape of the bracket 132 of FIG. 6A can be reduced to the smallest extent possible. In other words, the shape of the bracket 132 can be minimized. Specifically, a length in the vehicle transverse direction of the bracket 132 can be reduced to be smaller than or equal to a length in the vehicle transverse direction of a casing for the battery unit 102. As a result, the cost, weight, and space can be reduced. In other words, the battery unit 102 can be mounted in the passenger compartment without adversely affecting arrangement of other parts, occupant comfort, and the like.

The bracket 132 of FIG. 6A can improve the ease of mounting the air conditioning duct 134. This is because, in contrast to the comparative example of FIG. 6B in which the duct 134 needs to be inserted below the upper surface 232a of the bracket 232, the bracket 132 of FIG. 6A allows the duct 134 to be attached inside the two vertical wall portions 148 and 150, and therefore, the duct 134 can be easily mounted from above.

Note that, in this embodiment, the duct 134 is mounted on a carpet 156 provided on the floor panel 104. The duct 134 is mounted by fixing a duct mounting to a duct fixing hole 158 (see FIGS. 4A and 4B etc.) of the bracket 132 using a clip or the like.

Moreover, the floor panel 104 can be reinforced using the bracket 132 of FIG. 6A. This reinforcement will be described hereinafter.

Figure 7:
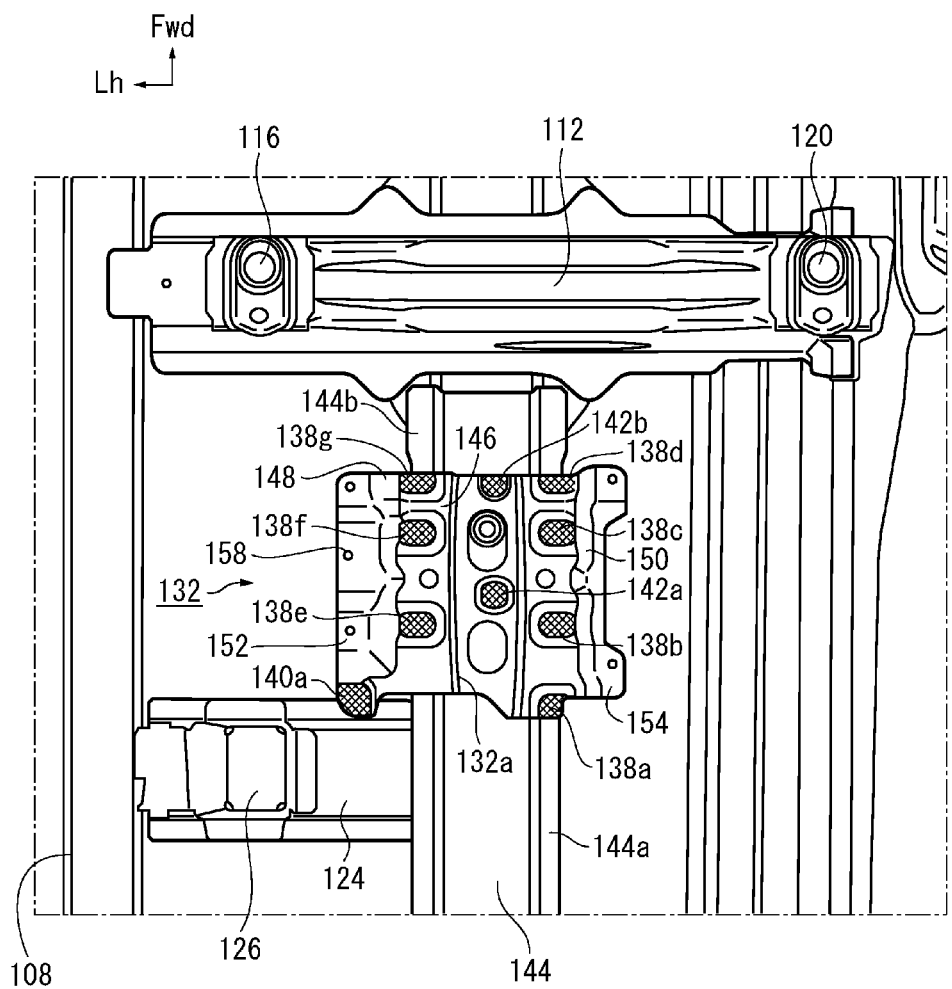
FIG. 7 is a diagram of a part shown in FIGS. 4A and 4B from which a floor panel has been removed.
Figure 8:
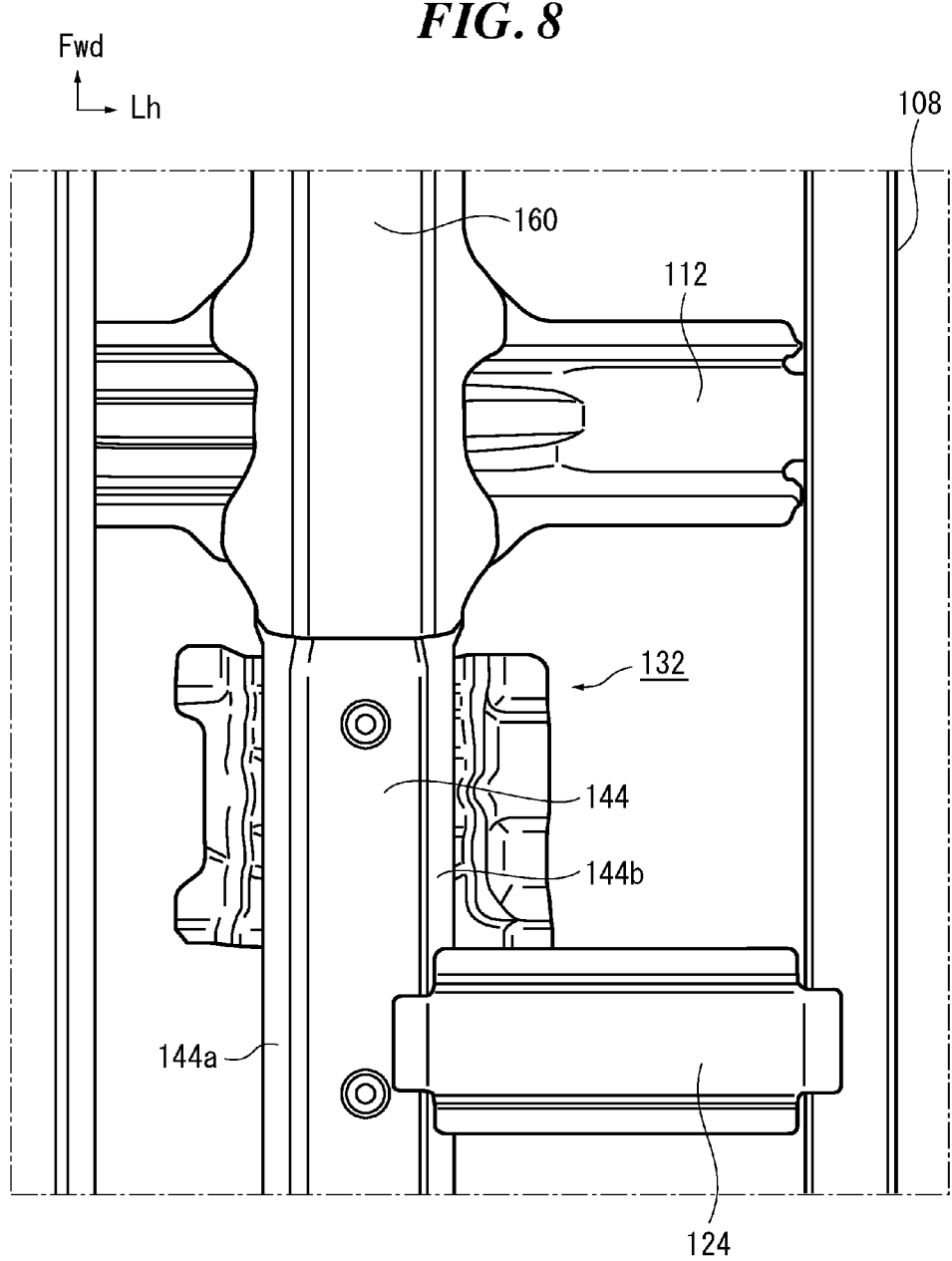
FIG. 8 is a diagram of a part shown in FIG. 7 as viewed from below.

FIG. 7 is a diagram of the part shown in FIGS. 4A and 4B from which the floor panel 104 is removed. FIG. 8 is a diagram of the part shown in FIG. 7 as viewed from below. As shown in FIGS. 7 and 8, the side member 144 (floor side rear member) extending in the vehicle longitudinal direction is attached to a lower surface of the floor panel 104. The side member 144 has a cross-section in the shape of an inverted hat when the side member 144 is attached to the lower surface of the floor panel 104 (see FIGS. 6A and 6B). A dashboard lower member 160 is connected to a front portion (with respect to the vehicle) of the side member 144. In this embodiment, the bracket 132 is mounted at a position which allows the bracket 132 to straddle the side member 144, i.e., on the upper surface of the floor panel 104 above the side member 144.

The floor panel lower cross member 124 extending in the vehicle transverse direction is attached to the lower surface of the floor panel 104 between the side sill 108 and the side member 144. The floor panel lower cross member 124 is provided at the back (with respect of the vehicle) of the floor panel upper cross member 112 with the bracket 132 and the battery unit 102 being provided therebetween. Note that the rear outer bracket 126 and the floor panel 104 are attached to the floor panel lower cross member 124.

Each of the attachment portions 138a, 138b, 138c, and 138d of the attachment portion 146 of the bracket 132, the floor panel 104, and a flange 144a on the right (with respect to the vehicle) of the side member 144 are joined on top of each other in a three-layer structure. Each of the attachment portions 138e, 138f, and 138g of the attachment portion 146 of the bracket 132, the floor panel 104, and a flange 144b on the left (with respect to the vehicle) of the side member 144 are joined on top of each other in a three-layer structure. The attachment portion 140a, the floor panel 104, and the floor panel lower cross member 124 are joined on top of each other in a three-layer structure.

For example, in the vehicle 100, the floor panel 104 may have a thickness of 0.65 mm, the side member 144 may have a thickness of 0.80 mm, the bracket 132 may have a thickness of 1.00 mm, and the floor panel lower cross member 124 may have a thickness of 1.40 mm, i.e., the floor panel 104 is not at all thick. In spite of this, because the bracket 132 is attached to the side member 144 and the floor panel lower cross member 124 as described above, the weights of the battery unit 102 and the like are supported by the side member 144 and the floor panel lower cross member 124, so that the concentration of load on the floor panel 104 can be avoided or reduced, and therefore, the risk of a break or crack in the floor panel 104 can be eliminated or reduced.

As shown in FIGS. 6A and 6B, the floor panel 104 and the attachment portion 146 of the bracket 132 have bead-shaped portions 104a and 132a, respectively, which protrude downward along the side member 144. The attachment portions 142a and 142b of the attachment portion 146 of the bracket 132 are provided at the bead-shaped portion 132a. Each of the attachment portions 142a and 142b and the bead-shaped portion 104a of the floor panel 104 are joined on top of each other in a two-layer structure. The bead-shaped portions 104a and 132a each having high stiffness are joined together, whereby damage and a break or crack can be prevented or reduced in the bead-shaped portions 104a and 132a. Note that a cable or the like may be provided in a space formed by the bead-shaped portions 104a and 132a protruding downward.

Note that, as shown in FIG. 5, in this embodiment, holes 164 and 166 are formed in the bead-shaped portion 132a of the bracket 132. As a result, the weight can be reduced, i.e., the weight of the bracket 132 can be reduced.

Preferred embodiments of the present invention have been described above with reference to the drawings and are not intended to limit the present invention. It will be obvious to those skilled in the art that various changes or modifications can be made without departing the scope of the present invention as defined in the claims.

For example, while the drive battery unit for operating the motor is mounted in the passenger compartment in the foregoing, the present invention is also applicable when an auxiliary battery or other parts are mounted in the passenger compartment.

The present invention is applicable to battery unit mounting structures for vehicles including a battery unit, and more particularly, to a vehicle battery unit mounting structure for mounting a battery unit to a floor panel of a vehicle.

The invention claimed is:

1. A battery unit mounting structure for a vehicle including a battery unit, comprising:
    a floor panel configured to form a floor surface of the vehicle;
    a side member attached to a lower surface of the floor panel, and extending in a longitudinal direction of the vehicle; and
    a bracket mounted on a region above the side member of an upper surface of the floor panel;
    wherein the bracket includes:
        an attachment portion provided on the upper surface of the floor panel, with the attachment portion, the floor panel, and the side member being joined on top of each other in a three-layer structure;
        two vertical wall portions extending upward and outward from respective corresponding end portions in a transverse direction of the vehicle of the attachment portion; and
        two support portions configured to support the battery unit, and each extending from an upper end of the corresponding one of the two vertical wall portions in a direction away from a center of the bracket.

2. The battery unit mounting structure according to claim 1, wherein a length in a vehicle transverse direction of the bracket is smaller than or equal to a length in the vehicle transverse direction of the battery unit.

3. The battery unit mounting structure according to claim 2, further comprising:
a cross member attached to the upper surface or the lower surface of the floor panel, and extending in the vehicle transverse direction;
wherein the attachment portion of the bracket, the floor panel, and the cross member are joined on top of each other in a three-layer structure.

4. The battery unit mounting structure according to claim 3, further comprising:
an air conditioning duct;
wherein the air conditioning duct is mounted below the battery unit supported by the two support portions, inside the two vertical wall portions.

5. The battery unit mounting structure according to claim 2, wherein the floor panel and the attachment portion of the bracket each include a bead-shaped portion protruding downward, and the bead-shaped portions are joined together.

6. The battery unit mounting structure according to claim 2, further comprising:
an air conditioning duct;
wherein the air conditioning duct is mounted below the battery unit supported by the two support portions, inside the two vertical wall portions.

7. The battery unit mounting structure according to claim 1, further comprising:
a cross member attached to the upper surface or the lower surface of the floor panel, and extending in a vehicle transverse direction;
wherein the attachment portion of the bracket, the floor panel, and the cross member are joined on top of each other in a three-layer structure.

8. The battery unit mounting structure according to claim 7, wherein the floor panel and the attachment portion of the bracket each include a bead-shaped portion protruding downward, and the bead-shaped portions are joined together.

9. The battery unit mounting structure according to claim 7, further comprising:
an air conditioning duct;
wherein the air conditioning duct is mounted below the battery unit supported by the two support portions, inside the two vertical wall portions.

10. The battery unit mounting structure according to claim 1, wherein the floor panel and the attachment portion of the bracket each include a bead-shaped portion protruding downward, and the bead-shaped portions are joined together.

11. The battery unit mounting structure according to claim 1, further comprising:
an air conditioning duct;
wherein the air conditioning duct is mounted below the battery unit supported by the two support portions, inside the two vertical wall portions.

* * * * *